United States Patent
Reddy et al.

(10) Patent No.: US 8,975,217 B2
(45) Date of Patent: Mar. 10, 2015

(54) METHODS FOR TREATING A WELL WITH A CROSS-LINKED WATER-SOLUBLE POLYMER-COMPLEXED METAL CATION NETWORK AND AN AROMATIC COMPOUND CAPABLE OF FORMING A CHELATING AGENT TO UNCROSS-LINK THE POLYMER

(75) Inventors: B. Raghava Reddy, Duncan, OK (US); Rajesh K. Saini, Duncan, OK (US); Sherry G. Gaskins, Lawton, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 710 days.

(21) Appl. No.: 12/490,099

(22) Filed: Jun. 23, 2009

(65) Prior Publication Data
US 2010/0323929 A1    Dec. 23, 2010

(51) Int. Cl.
*C09K 8/60* (2006.01)
*C09K 8/68* (2006.01)
*C09K 8/72* (2006.01)
(Continued)

(52) U.S. Cl.
CPC .............. *C09K 8/706* (2013.01); *C09K 8/685* (2013.01); *C09K 8/887* (2013.01); *C09K 8/92* (2013.01); *C09K 2208/26* (2013.01)
USPC ........... 507/212; 507/211; 507/224; 507/225; 507/215; 166/295; 166/305.1

(58) Field of Classification Search
CPC ........ C09K 8/514; C09K 8/08; C09K 8/5083; C09K 8/512; C09K 8/5086; C09K 8/502
USPC ......... 507/207, 208, 213, 214, 215, 216, 220, 507/263, 271, 212, 211, 224, 225; 166/303, 166/305.1, 295
See application file for complete search history.

(56) References Cited

U.S. PATENT DOCUMENTS 3,979,303 A * 9/1976 Kang et al. ................... 507/110
4,428,432 A   1/1984 Pabley
(Continued)

FOREIGN PATENT DOCUMENTS

| EP | 0506191 A1 | 9/1992 |
|---|---|---|
| GB | 2416792 A | 8/2006 |
| WO | 02055843 A1 | 7/2002 |

OTHER PUBLICATIONS

Society of Petroleum Engineers 50731, 1999 SPE International Symposium on Oilfield Chemsitry, Houston, TX, Feb. 16-19, 1999.
(Continued)

*Primary Examiner* — Susannah Chung
*Assistant Examiner* — Atnaf Admasu
(74) *Attorney, Agent, or Firm* — Craig W. Roddy; Baker Botts L.L.P.

(57) ABSTRACT

Methods are provided for treating a portion of a well. The method according to this aspect comprises the steps of: (A) forming a treatment fluid, the treatment fluid comprising: (i) water; (ii) a water-soluble polymer; (iii) a complexed metal cation that: (a) has a valence state of at least three; and (b) is capable of cross-linking the water-soluble polymer; and (iv) an aromatic compound that is capable of dissolving, melting, or chemically decomposing, dissociating, or reacting, to form a chelating agent, wherein the chelating agent comprising vicinal substituents containing donor heteroatoms, and wherein the chelating agent is capable of chelating the metal cation; and (B) introducing the treatment fluid into the well.

16 Claims, 11 Drawing Sheets

(51) Int. Cl.
  *C09K 8/528* (2006.01)
  *E21B 33/13* (2006.01)
  *C09K 8/70* (2006.01)
  *C09K 8/88* (2006.01)
  *C09K 8/92* (2006.01)

(56) References Cited

U.S. PATENT DOCUMENTS

| | | | |
|---|---|---|---|
| 5,102,558 A | | 4/1992 | McDougall et al. |
| 5,102,559 A | | 4/1992 | McDougall et al. |
| 5,219,475 A | * | 6/1993 | Lockhart et al. .............. 507/225 |
| 5,224,546 A | | 7/1993 | Smith et al. |
| 6,214,773 B1 | | 4/2001 | Harris et al. |
| 6,242,390 B1 | | 6/2001 | Mitchell et al. |
| 6,311,773 B1 | | 11/2001 | Todd et al. |
| 6,737,386 B1 | | 5/2004 | Moorhouse et al. |
| 7,082,995 B2 | * | 8/2006 | Hanes et al. .................. 166/279 |
| 7,297,665 B2 | | 11/2007 | Harris et al. |
| 7,345,013 B2 | | 3/2008 | Fraser |
| 2002/0160920 A1 | | 10/2002 | Dawson et al. |
| 2007/0270316 A1 | | 11/2007 | El Shaari et al. |

OTHER PUBLICATIONS

PCT International Search Report, PCT/GB2010/00461; issued Jun. 7, 2010.

* cited by examiner

Graph of Viscosity vs. Time for Base Solution Additionally Containing 0.1 g Anthranilic Acid Graph of Viscosity vs. Time for Base Solution Additionally Containing 0.51 g Trimethyl Acetylated Indulin Amine

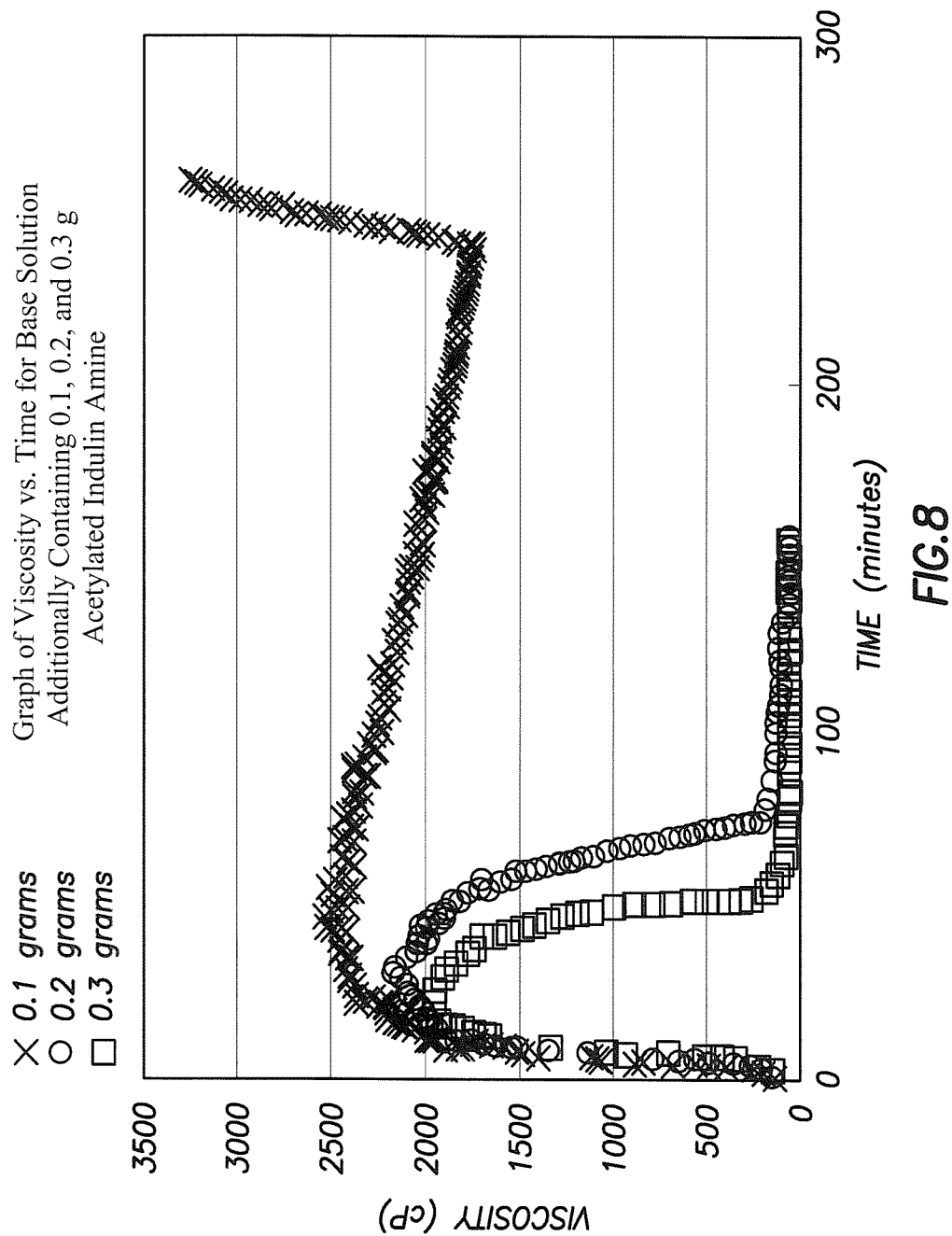

METHODS FOR TREATING A WELL WITH A CROSS-LINKED WATER-SOLUBLE POLYMER-COMPLEXED METAL CATION NETWORK AND AN AROMATIC COMPOUND CAPABLE OF FORMING A CHELATING AGENT TO UNCROSS-LINK THE POLYMER

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

SUMMARY

Methods according to the invention are directed to treating a subterranean formation for producing oil or gas.

According to the invention, a method for treating a portion of a well is provided. The method according to this aspect comprises the steps of: (A) forming a treatment fluid, the treatment fluid comprising: (i) water; (ii) a water-soluble polymer; (iii) a complexed metal cation that: (a) has a valence state of at least three; and (b) is capable of cross-linking the water-soluble polymer; and (iv) an aromatic compound that is capable of dissolving, melting, or chemically decomposing, dissociating, or reacting, to form a chelating agent, wherein the chelating agent comprising vicinal substituents containing donor heteroatoms, and wherein the chelating agent is capable of chelating the metal cation; wherein a test fluid consisting essentially of, in the same proportions as in the treatment fluid: (i) the water; (ii) the water-soluble polymer; (iii) the complexed metal cation; and (iv) the aromatic compound, wherein the aromatic compound is non-encapsulated in the test fluid, is capable of: (i) increasing from an initial viscosity to a maximum viscosity that is greater than the initial viscosity; and then (ii) decreasing to a decreased viscosity that is less than the maximum viscosity, when tested by heating the test fluid at a constant rate from an initial temperature of 25° C. to at least one elevated temperature in the range of 50° C.-100° C. over the course of 10 minutes and then maintained at that elevated temperature; and (B) introducing the treatment fluid into the well.

The features and advantages of the inventions will be more readily appreciated when considered in conjunction with the accompanying drawing.

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the invention. For example, the test fluid consists essentially of water, a water-soluble polymer, a complexed metal cation, and an aromatic compound; however, if the complexed metal cation is obtained in the form of an alcoholic solution for use in the formation of the treatment fluid, then the use and presence of the alcoholic solution of the cross-linker in the test fluid does not materially affect the basic and novel characteristics of the invention. By way of another example, the addition of a pH adjuster to the test fluid in the same manner and concentration as it is employed in forming the treatment fluid would not materially affect the basic and novel characteristics of the invention.

BRIEF DESCRIPTION OF THE DRAWING

The accompanying drawing is incorporated into the specification to help illustrate examples according to the presently most-preferred embodiment of the invention. The drawing is not to be construed as limiting the invention.

The experiments for the data contained in the drawing were performed with 53 mls of a base solution containing: 0.5% by weight of carboxymethyl hydroxypropylguar (CMHPG); 2% by weight of potassium chloride (KCl); and 0.1% by weight of a complexed zirconium metal cation cross-linker solution at a pH of 5.2 to 5.5. The figures are graphs of experiments on various test solutions plotting data for viscosity (cP) versus time (minutes). The viscosity was measured at a shear rate of 40 1/sec. The drawing includes the following figures:

FIG. 8 is a graph of viscosity vs. time for three different solutions of the base solution additionally containing 0.1 g, 0.2 g, and 0.3 g of acetylated indulin amine, respectively.

DETAILED DESCRIPTION OF THE INVENTION

Figure 1:
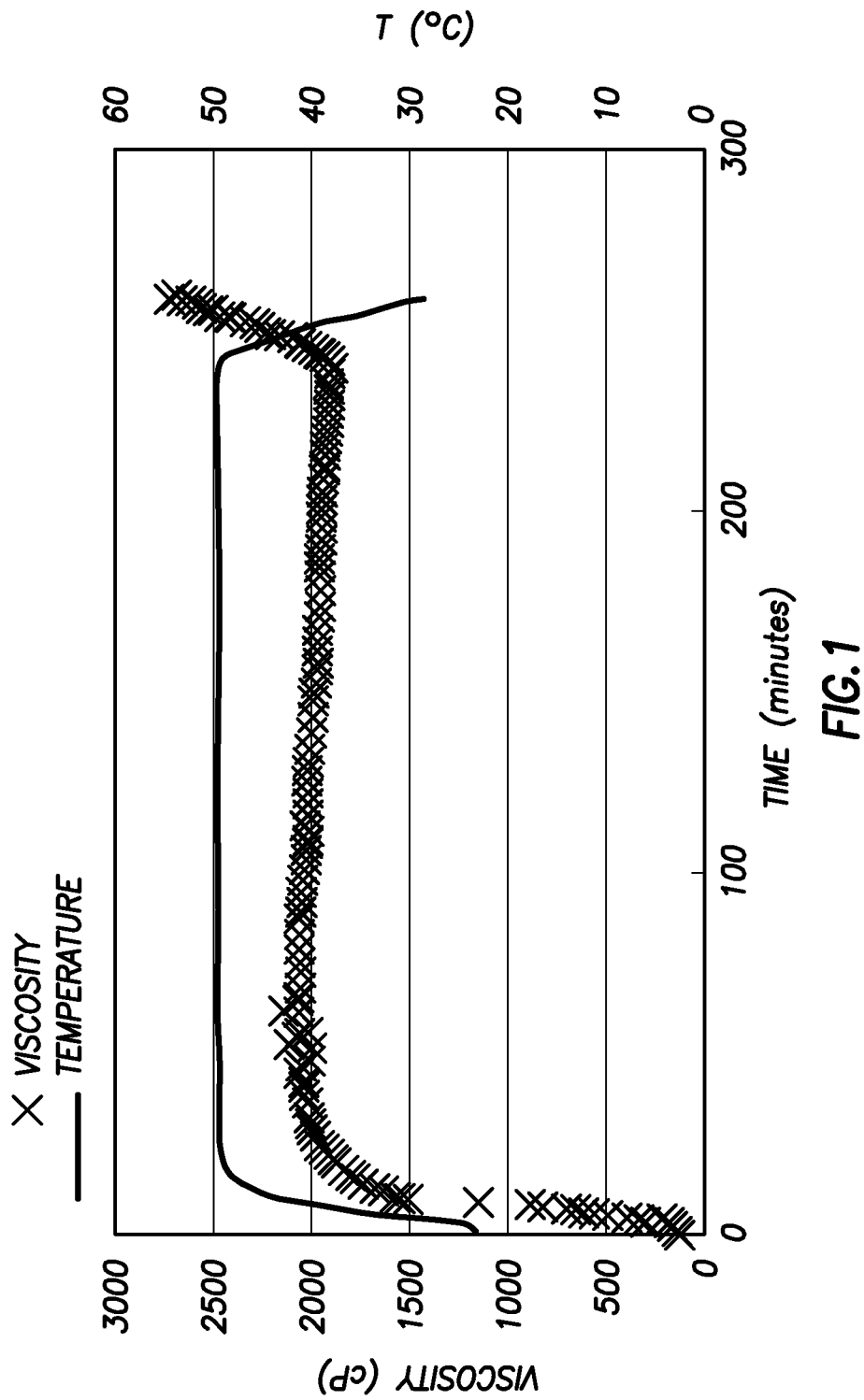
FIG. 1 is a graph of viscosity and temperature vs. time for the base solution.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a well is drilled into a subterranean formation.

As used herein, a "well" includes at least one wellbore drilled into a subterranean formation, which may be a reservoir or adjacent to a reservoir. A wellbore can have vertical and horizontal portions, and it can be straight, curved, or branched. As used herein, the term "wellbore" refers to a wellbore itself, including any uncased, openhole portion of the wellbore. A near-wellbore region is the subterranean material and rock of the subterranean formation surrounding the wellbore. The near-wellbore region is normally considered the region within about 100 feet of the wellbore. As used herein, a "well" also includes the near-wellbore region. As used herein, "into a well" means and includes into any portion of the well, including into the wellbore or into the near-wellbore region via the wellbore.

As used herein, a "fluid" is an amorphous substance having a continuous phase that tends to flow and to conform to the outline of its container (as a liquid or a gas) when tested at a temperature of 25° C. (77° F.) and a pressure of 1 atmosphere. A heterogeneous fluid has an external phase and at least one internal phase. By contrast, a homogenous fluid does not have distinct phases. Examples of a heterogenous fluid include, for example, a slurry or sol, which is a suspension of solid particles (such as sand) in a continuous liquid phase; an emulsion, which is a dispersion of two or more immiscible liquids where droplets of at least one liquid phase are dispersed in a continuous liquid phase of another; or a foam, which is a dispersion of gas bubbles in a continuous liquid phase. Further, as used herein, a "fluid" should be pumpable.

As used herein, the words "treatment" and "treating" mean an effort used to resolve a condition of a well. Examples of treatments include, for example, stimulation, isolation, or control of reservoir gas or water. The word "treatment" in the term "treatment fluid" does not necessarily imply any particular action by the fluid, but merely means that the fluid is to be used in a treatment of a well.

Stimulation treatments fall into two main categories, hydraulic fracturing and matrix treatments. In a hydraulic fracturing treatment, a treatment fluid is injected into a wellbore and into a near-wellbore region at a pressure that is above the fracture pressure of the subterranean formation. The higher fluid pressure fractures the formation to create a flow path between the subterranean formation and the wellbore. Hydraulic fracturing is described in more detail below. In a matrix treatment, a treatment fluid is injected into a wellbore and into a near-wellbore region at a pressure that is below the fracture pressure of the subterranean formation. The lower fluid pressure is sufficient to force the treatment fluid into the matrix of the formation but not sufficient to fracture the subterranean formation.

As mentioned above, "hydraulic fracturing" is a common stimulation treatment. A treatment fluid adapted for this purpose sometimes is referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

Fracturing a subterranean formation typically requires many thousands of gallons of fracturing fluid. Further, it is often desirable to fracture at more than one downhole location of a well. Thus, a high volume of fracturing fluid is usually required to treat a well, which means that a low-cost fracturing fluid is desirable. Because of the ready availability and relative low cost of water compared to other liquids, a fracturing fluid is usually water based. As used herein, a "water-based" fluid means a homogenous fluid of water or an aqueous solution or a heterogeneous fluid comprising water or an aqueous solution as the continuous phase.

After the pumping of the fracturing fluid is stopped, the fracture will tend to close. To prevent the fracture from closing, a material, called proppant, is placed in the fracture to keep the fracture propped open. Proppant is usually in the form of an insoluble particulate, which is suspended in the fracturing fluid, carried downhole, and deposited in the fracture. The proppant holds the fracture open while still allowing fluid flow through the permeability of the proppant. When deposited in the fracture, the proppant forms a "proppant pack," and, while holding the fracture open, provides conductive channels through which fluids can flow towards the wellbore. These channels provide an additional flow path for the oil or gas to reach the wellbore, which increases oil and gas production from the well.

As used herein, "proppant" means and refers to an insoluble particulate material that is suitable for use as a proppant pack, including without limitation, sand, synthetic materials, manufactured materials, and any combination thereof in any proportion. For this purpose, "proppant" does not mean or refer to suspended solids, silt, fines, or other types of insoluble particulate smaller than 0.0625 mm. Further, it does not mean or refer to insoluble particulates larger than 2 mm.

Suitable proppant materials include, but are not limited to, sand (silica), walnut shells, sintered bauxite, glass beads, plastics, nylons, resins, other synthetic materials, and ceramic materials. Mixtures of proppants can be used as well. If sand is used, it typically will be from about 20 to about 100 U.S. Standard Mesh in size. For a synthetic proppant, mesh sizes from about 8-100 typically are used. The concentration of proppant in a fracturing fluid can be in any concentration known in the art, and preferably will be in the range of from about 0.01 kilograms to about 3 kilograms of proppant per liter of continuous liquid phase (about 0.1 lb/gal-25 lb/gal).

An insoluble particulate also can be used for "gravel packing" operations. The insoluble particulate, when used for this purpose, is referred to as "gravel." More particularly in the oil and gas field and as used herein, the term "gravel" is sometimes used to refer to relatively-large insoluble particles in the sand size classification, that is, particles ranging in diameter from about 0.5 mm up to about 2 mm.

Proppant or gravel can have a different specific gravity than the homogenous treatment fluid or continuous phase of the treatment fluid. For example, sand (silica) has a specific gravity of about 2.7, whereas deionized water has a specific gravity of 1.0 (measured at 25° C. (77° F.) and 1 atmosphere pressure). Sand that is mixed with water will tend to settle out from the water. To help suspend a particulate, such as proppant or gravel, having a substantially different density than the treatment fluid, it is desirable to increase the viscoelasticity of the treatment fluid. A suspending agent can be used to increase the viscoelasticity of a treatment fluid.

A suspending agent tends to cause a fluid to gel or viscosify, which can be useful in suspending proppant or gravel in the fluid. Historically, the gel characteristics of a fluid have not been easy to measure directly; however, a viscosity measurement can be used as an indicator of the capacity of a fluid to suspend and transport a particulate. Accordingly, a suspending agent has often been referred to as a viscosity-increasing agent. Viscosity is the resistance of a fluid to flow, defined as the ratio of shear stress to shear rate. The viscosity of a treatment fluid is usually expressed in the unit centipoise ("cP"). Viscosity must have a stated or an understood shear rate and measurement temperature in order to be meaningful. As used herein, if not otherwise specifically stated, the viscosity of a fluid is measured with a Fann Model 50 or a Brookfield type viscometer at a shear rate of 40 1/s and at a temperature of 25° C. (77° F.).

While viscosity tends to correlate with the suspending capability of a fluid, viscosity is the resistance of a liquid to flow, which is not necessarily a measure of the suspending ability of a fluid. Even if the viscosity of a treatment fluid is high, that does not mean the treatment fluid can suspend an insoluble particulate such as proppant or gravel. Preferably, the treatment fluid has a sufficient viscosity and suspending capability to suspend proppant or gravel in the treatment fluid.

A suspending agent for a water-based fluid preferably comprises a water-soluble polymer. More preferably, the water-soluble polymer comprises a polysaccharide such as guar, xanthan, or diutan, or a modified polysaccharide such as hydroxyl ethyl guar hydroxypropyl guar, carboxymethylhydroxyethyl guar, carboxymethyl hydroxypropyl guar, hydroxyethylcellulose, carboxymethylhydroxyethyl cellulose, and carboxymethyl starch. The water-soluble polymer can comprise a synthetic polymer, such as a copolymer of 2-acrylamido-2methyl-propane sulfonic acid and acrylamide or a terpolymer of 2-acrylamido-2methyl-propane sulfonic acid, acrylic acid, and acrylamide.

To further increase the gelling of a fluid, the polymer can be cross-linked. As used herein, a "cross-link" or "cross-linking" is a connection between two or more polymer molecules. A cross-linking agent can be added to a treatment fluid to cross-link the polymer molecules. The cross-linking of the polymer molecules can form a network of the polymer molecules. This network can increase the viscosity of a treatment fluid and also increase the suspending capability of the treatment fluid to help suspend proppant or gravel present in the treatment fluid. In some cases, it is desirable to have sufficient cross-linking of the polymer to form a gel.

A cross-linking agent can be a complexed metal cation having a valence state of at least three. Examples of such a complexed metal cation include hydroxycarboxylates, aminocarboxylates, trialkanolamine, amines, and/or beta-diketone complexes of iron (III), chromium (III), aluminum (III), zirconium (IV), titanium (IV), and hafnium (IV). The number in the parenthesis represents valence state, also referred to as oxidation state or oxidation number, of the metal in the complex. Specific examples of complexed metal cations include zirconium ammonium lactate, zirconium lactate triethanolamine, zirconium carbonate, zirconium acetyl acetonate, zirconium malate, and zirconium citrate. The complexing metal cations listed above presumably form coordination complexes with the metal ions, and allow the complexed metal ion to form chelated structures selectively. Such complexes are described in: U.S. Pat. No. 7,297,665, having for named inventors Phillip C. Harris and Stanley J. Heath, issued on Nov. 20, 2007; U.S. Pat. No. 7,345,013, having for named inventors Greig Fraser, issued on Mar. 18, 2008; U.S. Pat. No. 6,737,386, having for named inventors Ralph Moorehouse and Lester E. Matthews, issued on May 18, 2004; and U.S. Pat. No. 6,214,773, having for named inventors Phillip C. Harris, Stanley J. Heath, David M. Barrick, Ron J. Powell, Billy F. Slabaugh, Shane L. Milson, Gregory L. Tanaka, and Harold G. Walters, issued on Apr. 10, 2001, each of which is incorporated by reference in its entirety. If there is any conflict between a reference incorporated by reference and the present disclosure, the present disclosure will control. Examples of commercially available complexed metal cations suitable for cross-linking polymers include "CL-23", "CL-40", "CL-37", and "CL-18" available from Halliburton Energy Services in Duncan, Okla.

The metal cation of the complexed metal cation is selected for being capable of cross-linking the water-soluble polymer molecules together to form a metal cation-polymer network. The complexed metal cation can be in the form of a salt of the cationic metal complex and a counter anion, or of the anionic metal complex and a counter cation depending on the number of the complexed groups per metal and their charges. The counter anion can be inorganic or organic. As used herein, an "inorganic" anion can be an anion such as cyanate, thiocyanate, and oxychloride or an anion that is formed when a mineral acid is neutralized such as carbonate, bicarbonate, sulfate, bisulfate, chloride, bromide, and nitrate. As used herein, an "organic" anion can be a carboxylate ion such as an acetate, a propionate ion, or a sulfonate ion such as benzene sulfonate. Examples of counter cations include ammonium ions and alkali metal ions, such as sodium and potassium ions. A partial description of the breadth of chemical structures useful for the present invention are provided in the publication (Society of Petroleum Engineers (SPE) paper 50731 presented at the 1999 SPE International Symposium on Oilfield Chemistry held in Houston, Tex., 16-19 Feb. 1999).

A treatment fluid can include a breaker. A breaker is a chemical used for the purpose of "breaking", i.e., reducing the viscosity of the treatment fluid so that the fluid can be recovered more easily from the formation during cleanup. Generally, oxidizing chemicals such as inorganic persulfates and hydrogen peroxide generating chemicals are used as breakers, which are believed to function by oxidatively degrading the polymer backbone into smaller fragments. In order to prevent premature viscosity reduction, the oxidizers are encapsulated for slow release of the oxidizer breaker. The oxidizers inherently are hazardous materials, and encapsulation adds to the cost of the materials. Additionally, their effectiveness is reduced at lower temperatures. Thus, there is a need for breakers which are less hazardous, do not require encapsulation, and are active even at low temperatures.

A chelating agent can be used as a breaker. A chelating agent can compete with the polymer for the metal cation under suitable conditions, especially at downhole temperatures. The metal cation and the chelating agent preferably have a stronger affinity for each other compared to the affinity between the metal cation and the polymer molecules. Therefore, the chelating agent can compete with the polymer for the metal cation to displace the metal cation from the metal cation-polymer complex to form a chelate complex with the metal cation under downhole temperatures. The metal-chelate complex is formed when the bonds between the metal cation and the polymer molecules are broken and the metal cation bonds with the chelating agent. If the cross-links of the metal cation-polymer network are broken, then the viscosity of the treatment fluid can be reduced. The breaking of, i.e., the reduction in, the viscosity allows the polymer of the treatment fluid to be removed more easily from the well.

A chelating agent, also called a ligand, is either an ion or molecule that bonds via coordinate covalent bonds to a central metal to produce a coordination complex, called a chelate. As used herein, a "chelating agent" is a Lewis base, i.e., the chelating agent contains at least at least two donor atoms in the same molecule capable of donating electrons to the metal cation). Preferred donor atoms are heteroatoms and include nitrogen, oxygen, and sulfur. The central metal is a Lewis acid, i.e., the central metal can accept pairs of electrons from the chelating agent. A chelating agent that bonds through two coordinating atoms is called bidentate; one that bonds through three is called tridentate, and so on.

A coordinate covalent bond is a covalent bond in which one atom (i.e., the donor atom) supplies both electrons. This type of bonding is different from a normal covalent bond in which two atoms each supply one electron. If the coordination complex carries a net charge, the complex is called a complex ion. Compounds that contain a coordination complex are called coordination compounds. Coordination compounds and complexes are distinct chemical species, for example, their properties and behavior are different from the metal ion and ligands from which they are composed.

According to the invention, the treatment fluid includes an aromatic compound that is capable of dissolving, melting, or chemically decomposing, dissociating, or reacting, to form a chelating agent, and where the chelating agent is capable of chelating the metal cation. The test fluid includes the aromatic compound in a non-encapsulated form. The test fluid can be the same or different from the treatment fluid. Preferably, the aromatic compound, in the treatment fluid or in the test fluid, does not interfere with the cross-linking reaction of the metal cation and polymer molecules to viscosify the treatment fluid. For example, the aromatic compound allows the metal cation-polymer network to form in order for the initial viscosity of the treatment fluid or test fluid to increase to a maximum viscosity. Some of the aromatic compound can form the chelating agent before or during the formation of the metal cation-polymer network. Preferably, at least some of the chelating agent that is formed during this timeframe does not substantially interfere with the formation of the metal cation-polymer network. For example, the chelating agent that may be formed does not interfere to such a degree as to inhibit the treatment fluid or test fluid from developing the maximum viscosity. Hence, the aromatic compound is delayed from forming the chelating agent without the need for encapsulating the aromatic compound.

One example of how the aromatic compound is delayed from forming the chelating agent is that the aromatic compound can be insoluble at a typical pre-introduction temperature (which is generally less than or equal to 25° C.), but dissolves in the treatment fluid to form the chelating agent after the treatment fluid is introduced into the downhole temperatures of the well (typically in the range of 50° C.-200° C., though some wells, particularly ultra-deep wells, can be up to 300° C. or even hotter). This delay allows time for the complexed metal cation to first cross-link the polymer to increase the viscosity of the treatment fluid, and then, after the aromatic compound dissolves to form the chelating agent, the chelating agent can compete with and displace the metal cation from the metal cation-polymer complex, thereby at least helping to break the viscosity of the treatment fluid. In addition to the delay in the formation of the chelating agent, the rate of the metal-chelate reaction will vary based on the affinity the particular chelating agent has for the metal cation and the particular downhole temperature. For example, if the affinity is high, then the metal-chelate complex can be formed at lower temperatures. Conversely, if the affinity is low, then higher temperatures might be required to form the metal-chelate complex. One of ordinary skill in the art can select the aromatic compound by taking into account the downhole temperatures for a given oil or gas operation and the affinity the chelating agent will have for the metal at those given temperatures.

The test fluid is capable of increasing from an initial viscosity to a maximum viscosity that is greater than the initial viscosity and then decreasing to a decreased viscosity that is less than the maximum viscosity when tested by heating the test fluid at a constant rate from an initial temperature of 25° C. to at least one elevated temperature in the range of 50° C.-100° C. over the course of 10 minutes and then maintained at that elevated temperature. Preferably, the treatment fluid exhibits the same capabilities as the test fluid. Preferably, the treatment fluid has the same initial viscosity, maximum viscosity, and reduced viscosity as the test fluid. The initial viscosity is the viscosity of the test or treatment fluid upon the formation of the test or treatment fluid, prior to cross-linking of the polymer. The maximum viscosity is the viscosity of the test or treatment fluid before the viscosity begins to decrease.

Preferably, the complexed metal cation cross-links the polymer such that the initial viscosity of the test or treatment fluid increases to a maximum viscosity that is at least four times the initial viscosity. Preferably, the maximum viscosity is at least 200 cP at the downhole temperatures and shear rates expected in the well treatment. After allowing the test or treatment fluid to develop the maximum viscosity, the maximum viscosity is then preferably reduced to less than 50% of the maximum viscosity by the formation of the metal-chelate complex. The aromatic compound can be used selectively to help control the timing for breaking the cross-links of the metal cation-polymer network. It is not necessary for the aromatic compound to be encapsulated; however, encapsulation of some or all of the aromatic compound can provide additional control of the timing of breaking the viscosity.

A treatment fluid according to the invention can include additional breakers which can also help decrease the maximum viscosity of the treatment fluid. For example, it is preferable that the chelating agent decrease the maximum viscosity of the treatment fluid to less than 50% of the maximum; however, more than one chelating agent or additional breakers can help achieve this decrease. The treatment fluid can also include a surfactant. For example, a surfactant can be used for its ability to aid the dispersion and/or stabilization of a gas component into the fluid. Further, a treatment fluid can contain other materials, additives, and chemicals that are used in oil field applications. These include, but are not necessarily limited to, a breaker aid, a co-surfactant, an oxygen scavenger, alcohol, a scale inhibitor, a corrosion inhibitor, a fluid-loss additive, an oxidizer, a bactericide, a biocide, a microemulsion, and the like. The treatment fluid can also include a gas for foaming the fluid.

More than one treatment fluid may be used during the course of a treatment operation. For example, one treatment fluid may require a higher concentration of proppant, and another treatment fluid may require a lower concentration of proppant. Changes in the treatment fluids used may be made in stepped changes of concentrations or ramped changes of concentrations.

Preferred Embodiment of the Invention

According to the invention, a method for treating a portion of a well is provided. The method according to this aspect comprises the steps of: (A) forming a treatment fluid, the treatment fluid comprising: (i) water; (ii) a water-soluble polymer; (iii) a complexed metal cation that: (a) has a valence state of at least three; and (b) is capable of cross-linking the water-soluble polymer; and (iv) an aromatic compound that is capable of dissolving, melting, or chemically decomposing, dissociating, or reacting, to form a chelating agent, wherein the chelating agent comprising vicinal substituents containing donor heteroatoms, and wherein the chelating agent is capable of chelating the metal cation; wherein a test fluid consisting essentially of, in the same proportions as in the treatment fluid: (i) the water; (ii) the water-soluble polymer; (iii) the complexed metal cation; and (iv) the aromatic compound, wherein the aromatic compound is non-encapsulated in the test fluid, is capable of: (i) increasing from an initial viscosity to a maximum viscosity that is greater than the initial viscosity; and then (ii) decreasing to a decreased viscosity that is less than the maximum viscosity, when tested by heating the test fluid at a constant rate from an initial temperature of 25° C. to at least one elevated temperature in the range of 50° C.-100° C. over the course of 10 minutes and then maintained at that elevated temperature; and (B) introducing the treatment fluid into the well.

The treatment fluid preferably has a continuous phase of an aqueous fluid. The treatment fluid may include proppant or gravel. The treatment fluid may include a surfactant, a cross-linking initiator, a breaker aid, a co-surfactant, an oxygen scavenger, a scale inhibitor, a corrosion inhibitor, a fluid-loss additive, an oxidizer, a bactericide, a biocide, or additional breakers. The treatment fluid can include dissolved inorganic salts. If the treatment fluid includes salts, then preferably the salts are in a concentration of at least 1% by weight of the water in the treatment fluid. Further, the treatment fluid can include a gas for foaming the fluid.

The treatment fluid includes water. The water can be selected from the group consisting of freshwater, seawater, brine, and any combination thereof in any proportion.

The treatment fluid includes a water-soluble polymer. The polymer can be selected from: a polymer comprising one or more polysaccharides; one or more chemically-modified polysaccharides; one or more synthetic polymers; and any combination thereof in any proportion. The polysaccharide can be selected from the group consisting of guar, xanthan, diutan, starch, and any combination thereof in any proportion. The polymer comprising chemically-modified polysaccharides can be selected from the group consisting of hydroxyl ethyl guar hydroxypropyl guar, carboxymethylhydroxyethyl guar, carboxymethyl hydroxypropyl guar, hydroxyethylcellulose, carboxymethylhydroxyethyl cellulose, carboxymethyl starch, and any combination thereof in any proportion. The synthetic polymer can be selected from the group consisting of: a copolymer of 2-acrylamido-2methyl-propane sulfonic acid and acrylamide; a terpolymer of 2-acrylamido-2methyl-propane sulfonic acid, acrylic or itaconic acid, and acrylamide, and any combination thereof in any proportion. Preferably, the polymer is at a concentration of at least 0.1% by weight of the water in the treatment fluid. More preferably, the polymer is at a concentration in the range of 0.2% to 5% by weight of the water in the treatment fluid.

As used herein, the term "water-soluble" means that more than 0.1 g of a substance dissolves in one liter of deionized water at a temperature of 77° F. and a pressure of 1 atmosphere.

The treatment fluid includes a complexed metal cation. The metal cation has a valence state of at least three. The metal cation can be selected from the group consisting of trivalent metal cations, tetravalent metal cations, and any combination thereof in any proportion. Examples of suitable metal cations include $Fe(3+)$, $Cr(3+)$, $Al(3+)$, $Ti(4+)$, $Zr(4+)$, and $Hf(4+)$. The number in the parenthesis indicates the ionic charge on the metal cation used in forming the complexed metal cation. Examples of complexed metal cations include: hydroxycarboxylates such as lactates; aminocarboxylates such as iminodiacetate; trialkanolamines such as triethanolamine; amines such as triisopropylamine; and beta-diketones such as acetylacetonate complexes of $Fe(3+)$, $Cr(3+)$, $Al(3+)$, $Ti(4+)$, $Zr(4+)$, and $Hf(4+)$. The complexed metal cation can be in the form of a salt of the cationic metal complex and a counter anion, or of the anionic metal complex and a counter cation depending on the number of the complexed groups per metal and their charges. The counter anion may be inorganic or organic. Examples of inorganic counter anions include, but are not limited to, carbonate, bicarbonate, sulfate, bisulfate, chloride, bromide, nitrate, cyanate, thiocyanate, and oxychloride. Examples of organic counter anions include, but are not limited to: carboxylate ions, e.g., acetate; propionate ions; and sulfonate ions, e.g., benzene sulfonate. Examples of counter cations include ammonium ions and alkali metal ions, such as sodium and potassium ions.

The complexed metal cation is added as an aqueous or alcoholic cross-linker solution to the water and polymer in a concentration in the range of 0.01% to 1% by weight of the polymer-water solution (0.1 to about 10 gallons per thousand gallons). The aqueous or alcoholic cross-linker solution may contain the actual metal ion concentration in the range of 2%-20% by weight of the cross-linker solution. The pH of the treatment fluid may be adjusted to be in the range of about 3.5 to about 9.5.

The polymer and complexed metal cation are capable of cross-linking to form a metal cation-polymer network. The complexed metal cation is a cross-linking agent for the polymer. The polymer is preferably at least partially cross-linked with the complexed metal cation prior to the step of introducing the treatment fluid into the well. The complexed metal cation-polymer network is capable of increasing the viscosity of the treatment fluid, wherein at least one time during the step of introducing the treatment fluid into the well, the initial viscosity of the treatment fluid increases to a maximum viscosity.

The treatment fluid comprises an aromatic compound that is capable of dissolving, melting, or chemically decomposing, dissociating, or reacting, to form a chelating agent, wherein the chelating agent comprising vicinal substituents containing donor heteroatoms, and wherein the chelating agent is capable of chelating the metal cation. The aromatic compound in the treatment fluid is preferably non-encapsulated; however, all or a portion of the aromatic compound can be encapsulated. The treatment fluid can include more than one aromatic compound. Preferably, the aromatic compound forms the chelating agent after the treatment fluid has been introduced into the well. According to one preferred embodiment of the invention, the aromatic compound dissolves to form the chelating agent. According to another embodiment, the aromatic compound reacts to form the chelating agent via hydrolysis, for example, the compound may react with the water of the treatment fluid to form the chelating agent. As an example, the hydrolysis of acetyl groups in acetyl salicylic acid or methyl salicylate can form a chelating agent of salicylic acid. In another embodiment, the aromatic compound forms the chelating agent when the pH of the treatment fluid changes. For example, the pH of the treatment fluid can be controlled to increase from an initial, low pH to an increased pH of 5.0 or higher, at which increased pH the aromatic compound hydrolyzes to form the chelating agent.

The test fluid consists essentially of: (i) the water; (ii) the water-soluble polymer; (iii) the complexed metal cation; and (iv) the aromatic compound, wherein the aromatic compound is non-encapsulated in the test fluid. These components of the test fluid are in the same proportion as these four components in the treatment fluid. The test fluid can contain other ingredients as in the treatment fluid that do not materially affect the basic and novel characteristic(s) of the invention. For example, the test fluid can include the complexed metal cation in an alcoholic solution, if that is how the complexed metal cation is obtained for use in the treatment fluid. The test fluid is capable of: (i) increasing from an initial viscosity to a maximum viscosity that is greater than the initial viscosity; and then (ii) decreasing to a decreased viscosity that is less than the maximum viscosity, when tested by heating the test fluid at a constant rate from an initial temperature of 25° C. to at least one elevated temperature in the range of 50° C.-100° C. over the course of 10 minutes and then maintained at that elevated temperature; and (B) introducing the treatment fluid into the well.

Preferably, the treatment fluid has the same capabilities as the test fluid. The treatment fluid will have an initial, maximum, and decreased viscosity. Preferably, the treatment fluid has the same initial viscosity, maximum viscosity, and decreased viscosity as the test fluid.

Preferably, the aromatic compound allows the metal cation to cross-link the polymer such that the initial viscosity of the test fluid increases to a maximum viscosity. Some of the chelating agent may start forming a metal-chelate complex before the viscosity of the test fluid is increased to the maximum viscosity. Preferably, the aromatic compound and the chelating agent that may be formed from the aromatic compound are not capable of cross-linking the polymer. Preferably, the maximum viscosity of the test fluid is at least four times the initial viscosity of the test fluid. Preferably, the maximum viscosity is at least four times the initial viscosity and the decreased viscosity is less than 50% of the maximum viscosity. (It should be understood that the decreased viscosity can be higher than the initial viscosity.) More preferably, the test fluid reaches a maximum viscosity in the range of 10 to 500 times the initial viscosity of the test fluid. The specified viscosity values are measured under a shear rate of 40 1/sec. Preferably, the test fluid is maintained at the maximum viscosity for a desired time before the viscosity of the test fluid is reduced. More preferably, the desired time is at least 30 minutes. Preferably, the maximum viscosity of the treatment fluid is capable of suspending the aromatic compound (if in a solid form), proppant, or gravel in the treatment fluid prior to the step of introducing.

According to a preferred embodiment of the invention, the complexed metal cation and the chelating agent are capable of forming a metal-chelate complex that is more thermodynamically stable than the cross-linked metal cation-polymer network. Thus, the chelating agent favorably competes with the polymer for the metal cation to form the metal-chelate complex at downhole temperature and pH. Accordingly, at least some of the chelating agent breaks at least some of cross-links of the metal cation-polymer network in the formation of the metal-chelate complex, which reduces the viscosity of the test or treatment fluid.

Preferably, the viscosity of the test fluid is reduced to less than 50% of the maximum viscosity. More preferably, the viscosity of the test fluid is reduced to less than 10% of the maximum viscosity. Most preferably, the viscosity of the treatment fluid is reduced to the initial viscosity. Preferably, the viscosity of the test fluid is reduced to at most 100 cP after the step of introducing the treatment fluid into the well. Preferably, the viscosity of the treatment fluid is reduced such that the treatment fluid is capable of being removed from the well after the metal-chelate complex is formed.

Preferably, the metal-chelate complex formed includes at least one ring of at least five atoms including the metal cation. For example, the metal-chelate complex can include a ring with the metal cation of five, six, or seven atoms. It is understood that the metal chelate complex may contain two or more rings with each ring containing five, six, or seven atoms including the metal ion. A representative metal chelate structure is shown below, wherein: n is 1-4; $M^+$ represents the metal cation; m represents the charge on the metal ion prior to complexation with the ligand and may range from 3-4; and X and Y are vicinal substituents containing donor heteroatoms.

The "wiggly line" coming out of the aromatic ring represents other substituents or nonessential components of the molecule.

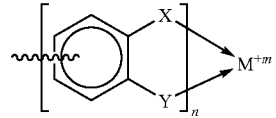

The chelating agent contains vicinal substituents containing donor heteroatoms. Preferably, the chelating agent is not an oxidizer. The chelating agent can comprise any of the following chemical structures, wherein X and Y are vicinal:

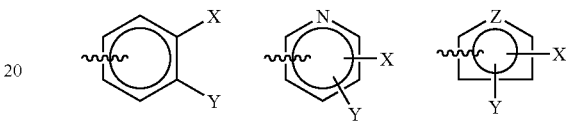

wherein X and Y each independently is selected from the group consisting of —OH, —O—, —COR, —O$^-$A$^+$, —NR$_1$R$_2$, —OR, —COOH, —COO$^{31}$ A$^+$, —C(R)O, —CONR$_1$R$_2$, —CR$_1$R$_2$OH, —C R$_1$R$_2$NH2, —CR$_1$R$_2$—COOH, —CR$_1$R$_2$COOR, —CR$_1$R$_2$COO$^-$A$^+$, —C(R)=NR, SR, and S$^-$A$^+$; wherein R, R1, and R2 are independently H, or alkyl groups containing 1-4 carbons; wherein A$^+$ is an alkali metal ion or an ammonium ion; and wherein Z can be S, O, or NH (in which case the aromatic rings are named as being derivatives of thiophene, furan or pyrrole, respectively).

According to one aspect of the invention, the aromatic ring can contain additional substituents. For example, the aromatic ring can be a substituted benzene ring, a pyridine ring, a thiophene ring, a pyrrole ring, a naphthalene ring, an anthracene ring, a phenanthrene ring, or part of a lignin.

In a most-preferred embodiment, the aromatic ring is a benzene ring. If the aromatic ring is a benzene ring, then, preferably, the compound can be selected from the group consisting of salicyladehyde, salicyladimine, salicylic acid, sodium salicylate, acetyl salicylic acid, methyl salicylic acid, methyl acetylsalicylic acid, anthranilic acid, acetyl anthranilic acid, eugenol, vanillin, derivatized 1,2-dihydroxybenzene (catechol), derivatized or unsubstituted phthalic acid, ortho-phenylenediamine, ortho-aminophenol, and ortho-hydroxyphenylacetic acid.

According to another preferred embodiment, the aromatic ring can be part of a lignin structure. If the aromatic ring is part of a lignin, then, preferably, the lignin is water insolubilized at room temperature by suitable chemical means such that it becomes soluble after allowing the polymer to be cross-linked by the complexed metal cation by any of the paths described earlier. The insolubilized lignin is selected from the group consisting of sulfonated lignins and sulfonated amino lignins. The insolubilized sulfonated lignins can be selected from the group consisting of sulfomethylated lignins and lignosulfonates. Sulfomethylated amino lignins can be modified chemically, for example by acetylation, to render them insoluble in the fluids prior to cross-linking. Sulfomethylated lignins and lignosulfonates may be insolubilized by controlling the degree of sulfonation.

Preferably, the aromatic compound is at a concentration sufficient to form a sufficient concentration of the chelating agent to react with all of or a significant portion of the complexed metal cation in the treatment fluid. For example, the aromatic compound is at a concentration in the treatment fluid such that it is capable of forming a chelating agent in the water in a concentration sufficient to chelate at least 25% of the mole concentration of the metal cation. More preferably, the aromatic compound is at a concentration in the treatment fluid such that it is capable of forming a chelating agent in the water in a concentration sufficient to chelate in the range of 50%-100% of the mole concentration of the complexed metal cation.

The method can further include the step of removing at least a portion of the polymer from the well. The polymer can be removed after the chelating agent reduces the maximum viscosity of the treatment fluid to less than the maximum viscosity. For example, the polymer can be removed by flowing the polymer from the well. Alternatively, for example, the polymer can be introduced via an injection well, and the polymer can be removed via a production well.

EXAMPLES

To facilitate a better understanding of the present invention, the following examples of certain aspects of preferred embodiments are given. The following examples are not the only examples that could be given according to the present invention and are not intended to limit the scope of the invention.

The treatment fluid according to the experiments was heated from an initial temperature of 25° C. to an elevated temperature as specified in the Figures and then maintained at the elevated temperature for a predetermined duration in one set of experiments, or the temperature was then increased to a next higher temperature and maintained at that temperature for a predetermined duration. The viscosity for the experiments was measured during the entire duration of the experiment.

The experiments for the data contained in the following Figures were performed in a base solution containing: 0.5% by weight of carboxymethyl hydroxypropylguar (CMHPG); 2% by weight of potassium chloride (KCl); and 0.1% by weight of a complexed zirconium metal cation cross-linker solution, CL-23 available from Halliburton Energy Services, at a pH of 5.2 to 5.5. A typical procedure used for all the experiments utilizing viscosity measurements is as follows: the polymer was gradually added to a 2% KCl solution in tap water while stirring in a Waring blender; the polymer was allowed to hydrate with stirring for 30 minutes; the pH of the solution was adjusted to the desired range using a pH buffer solution; and the cross-linker solution was added. The aromatic compound was added either before or after the addition of the cross-linker. It is preferable that the aromatic compound is added after the addition of cross-linker. A measured volume of the solution was added to the viscometer cup and attached to the instrument. The viscosity was measured with a shear rate of 40 1/sec and expressed in units of cP. The Figures include graphs of viscosity (cP) versus time (min).

The experiments were performed either at a constant temperature to measure the time required for the chelating agent to reduce the viscosity to desired levels, or at variable temperatures with a step-wise increase in temperature at regular intervals to identify the temperature at which the chelating agent begins to decrease the viscosity actively. The latter experiments allow selection of suitable chemicals for viscosity reduction in a desired temperature range. A Brookfield PVS viscometer was used to measure the viscosity of the fluid. The viscosity was measured at a pressure of 200 psi using a B02 bob with an annulus gap of 0.242 and a fluid volume of 53 mls.

FIG. 1 is a graph of viscosity vs. time for a control experiment of the base solution. The graph includes additional temperature information. The graph shows no reduction in the viscosity of the solution over time.

Figure 2:
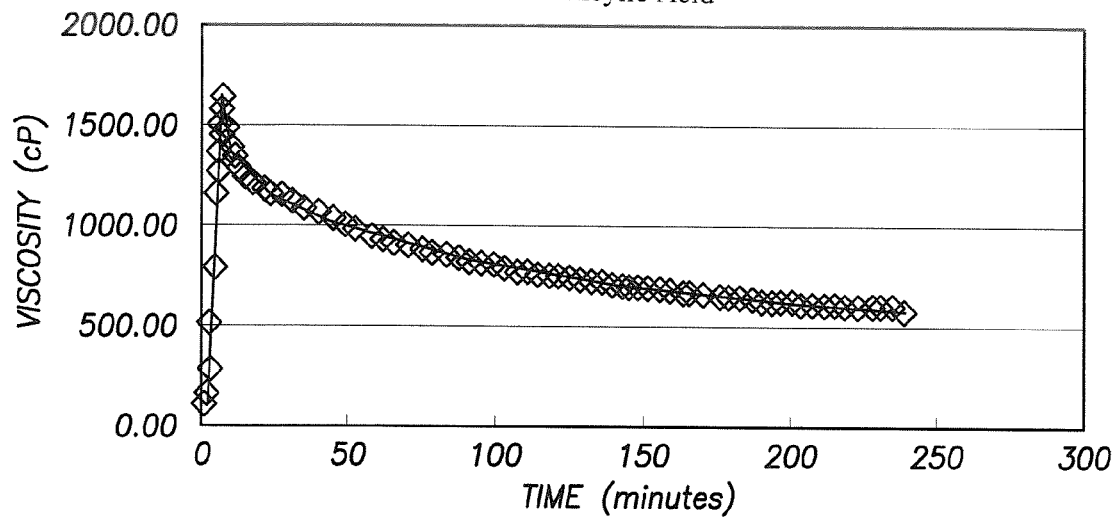
FIG. 2 is a graph of viscosity vs. time for the base solution additionally containing 0.1 g of salicylic acid.
Figure 3:
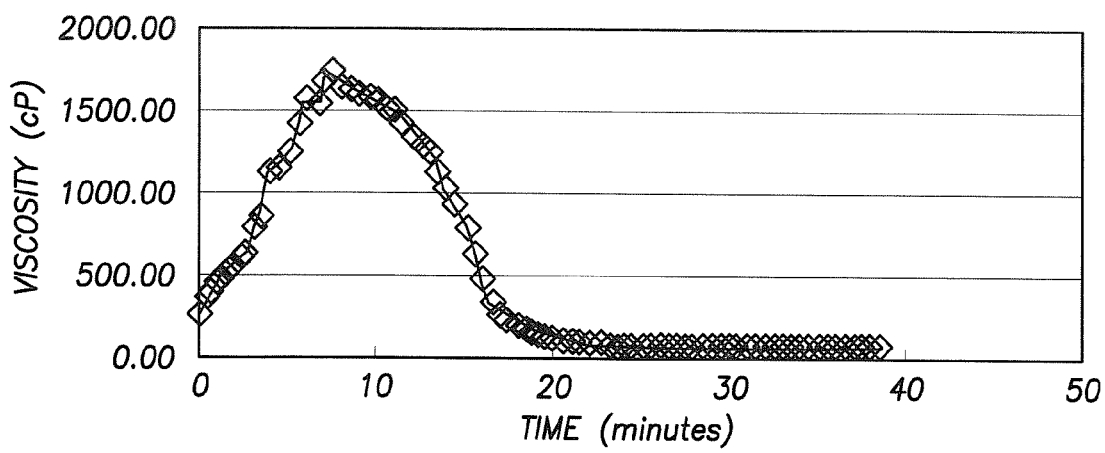
FIG. 3 is a graph of viscosity vs. time for the base solution additionally containing 0.324 g of acetylsalicylic acid.
Figure 4:
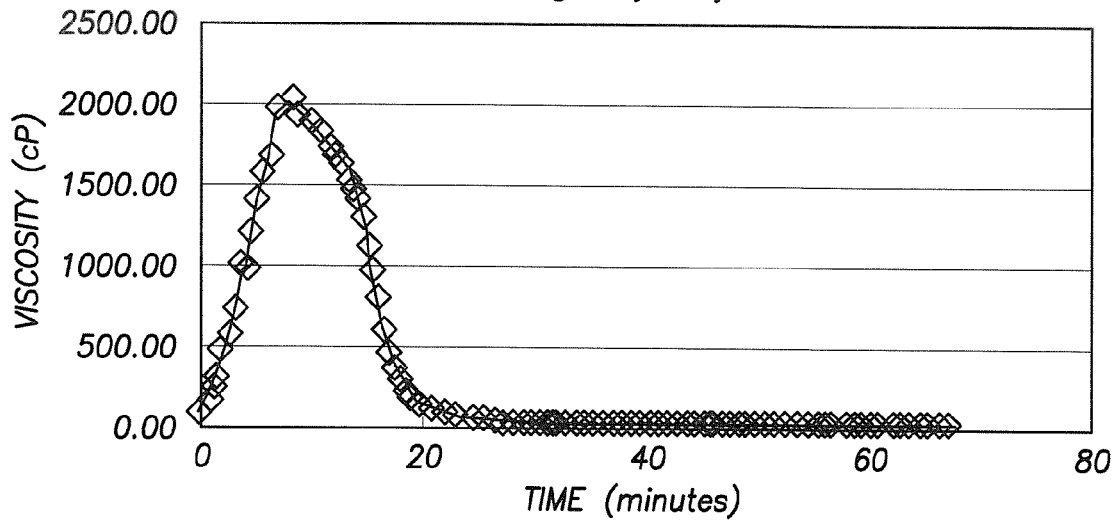
FIG. 4 is a graph of viscosity vs. time for the base solution additionally containing 0.22 g of acetylsalicylic acid.

FIG. 2 is a graph of viscosity vs. time for the base solution additionally containing 0.1 g of salicylic acid. Salicylic acid contains hydroxyl and carboxyl groups in a vicinal relationship on a benzene ring. The graph shows that salicylic acid can act as a breaker, even though the final viscosity of the solution is higher than desired. It may be that a higher concentration of salicylic acid would lead to a more desirable reduction in viscosity. Salicylic acid can be derivatized by acetylation of the alcohol group to produce acetylsalicylic acid, thus reducing the water solubility of the salicylic acid. FIGS. 3 and 4 are graphs of viscosity vs. time for the base solution additionally containing 0.324 g and 0.22 g, respectively, of acetylsalicylic acid. Both graphs show that acetylsalicylic acid, in these concentrations, is an effective breaker that reduced the viscosity of the solution to a desirable viscosity.

Figure 5:
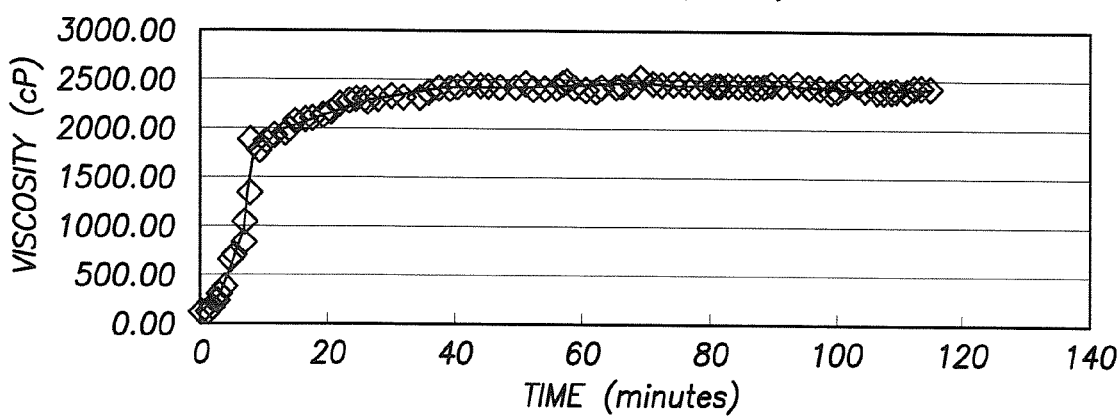
FIG. 5 is a graph of viscosity vs. time for the base solution additionally containing 0.066 g of methyl salicylate.
Figure 6:
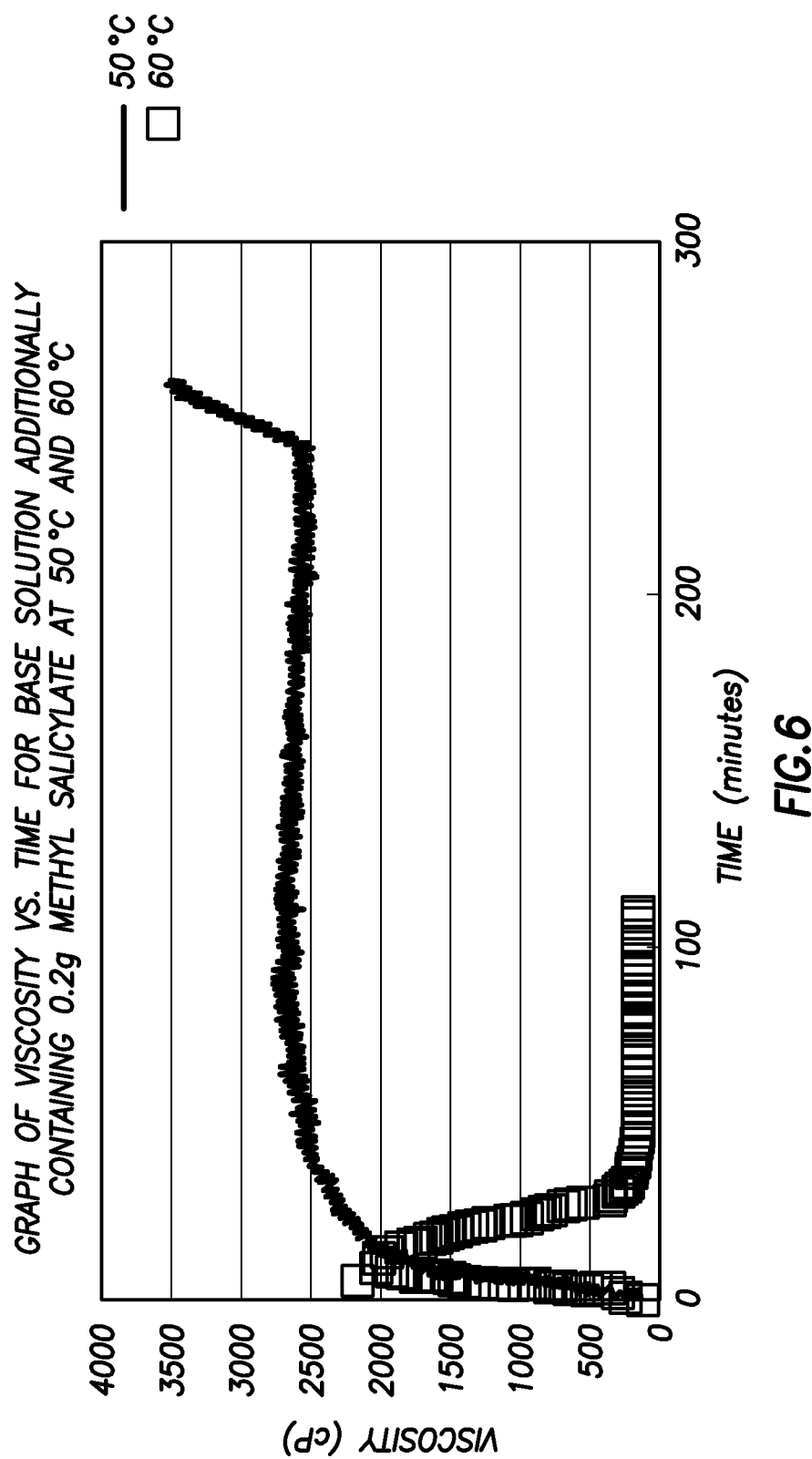
FIG. 6 is a graph of viscosity vs. time for the base solution additionally containing 0.2 g of methyl acetylsalicylate, at temperatures of 50° C. and 60° C.

FIG. 5 is a graph of viscosity vs. time for the base solution additionally containing 0.066 g of methyl salicylate. The carboxylic group of salicylic acid is derivatized to form the methyl ester, methyl salicylate. The graph does not show a reduction in viscosity because it is believed that the concentration of methyl salicylate was too low, the methyl salicylate has high volatility due to low boiling point, or because the temperature of the solution was too low. FIG. 6 is a graph of viscosity vs. time for the base solution additionally containing 0.2 g of methyl acetylsalicylate. Both the carboxylic group and the alcohol groups of salicylic acid can be derivatized to form methyl acetylsalicylate. The graph shows that the viscosity of the solution does not break at a temperature of 50° C., but a complete viscosity breakdown occurs at a temperature of 60° C.

Figure 7:
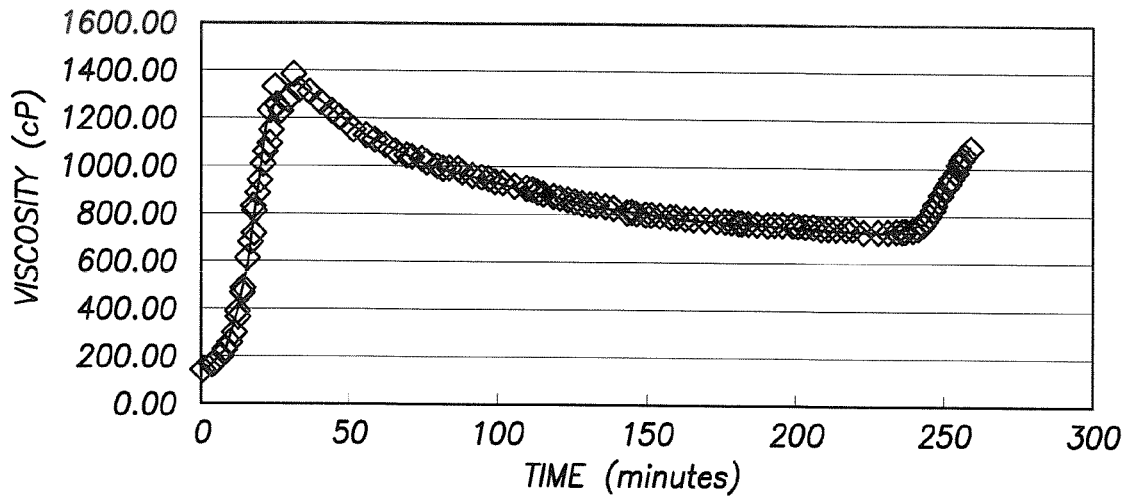
FIG. 7 is a graph of viscosity vs. time for the base solution additionally containing 0.1 g of anthranilic acid.

FIG. 7 is a graph of viscosity vs. time for the base solution additionally containing 0.1 g of anthranilic acid. Anthranilic acid contains an amino group and a carboxylic acid in a vicinal relationship on a benzene ring. The graph shows the viscosity of the solution was not reduced to a desired viscosity because it is believed that the concentration of anthranilic acid was insufficient or the temperature was not high enough for the anthranilic acid to uncross-link the polymer at an adequate reaction rate.

FIG. 8 is a graph of viscosity vs. time for the base solution additionally containing 0.1 g, 0.2 g, and 0.3 g of acetylated indulin amine. Acetylated indulin amine is an acetylated sulfomethylated ligninamine. Lignins contain benzene rings with hydroxyl and methoxy groups, or two hydroxyl groups, in a vicinal relationship. Acetylation of sufomethylated indulin amine obtained from MeadWestvaco, Charleston, S.C., USA under the trade name INDULIN W-1 was accomplished by stirring the material in acetic anhydride and pouring the material onto solid ice. The solid was washed repeatedly with water, and the washed solid was dried and used. The graph shows that varying concentrations can be used to control the amount of breaking desired and the time required for the solution to break.

Figure 10:
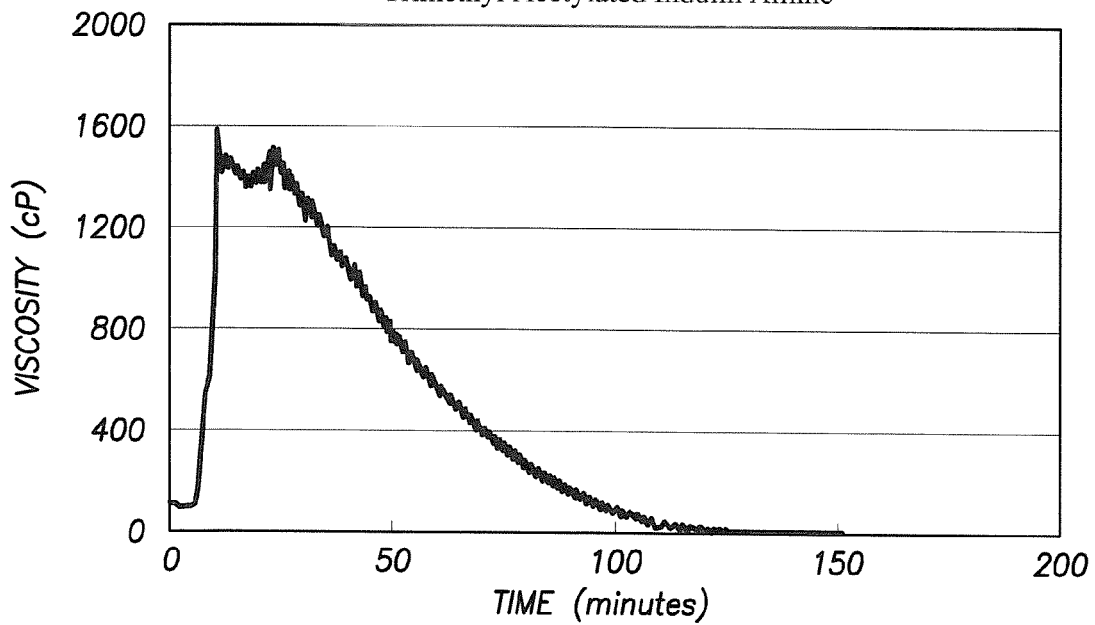
FIG. 10 is a graph of viscosity and temperature vs. time for the base solution additionally containing 0.51 g of trimethyl acetylated indulin amine.
Figure 9:
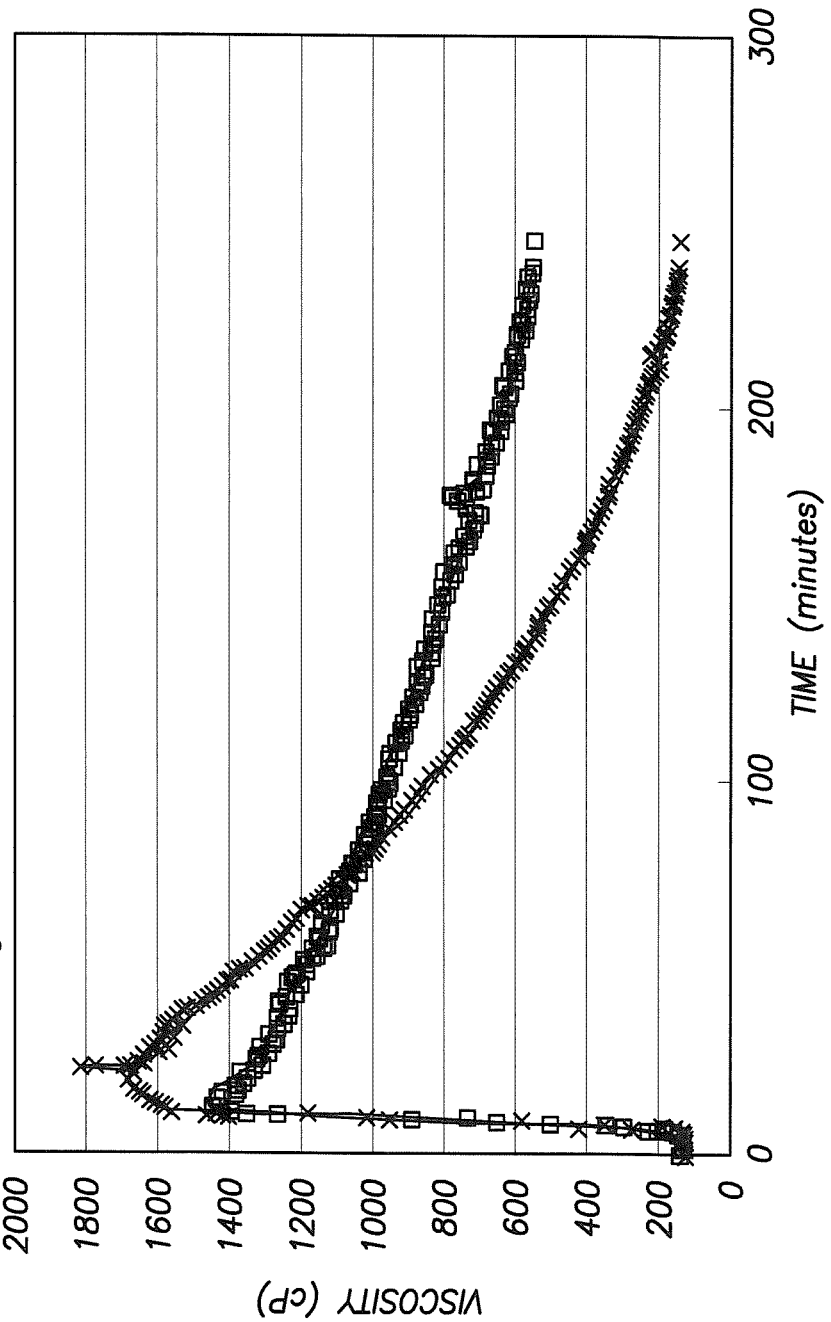
FIG. 9 is a graph of viscosity vs. time for two different solutions of the base solution additionally containing 0.1 g and 0.5 g of trimethyl acetylated indulin amine, respectively.

In order to extend the use of INDULIN W-1 as a way to reduce viscosity at elevated temperatures, INDULIN W-1 was acetylated with a trimethylacetyl group which requires higher temperatures to form the chelating agent, presumably by hydrolysis. The reaction was carried out by dissolving INDULIN W-1 in pyridine followed by the addition of trimethylacetyl chloride. The reaction was allowed to proceed and the solid isolated in a manner identical to that of the acetylated product. The polymer used in the cross-linking reaction was a diesel oil suspension of CMHPG available commercially from Halliburton as LGC VI. FIG. 9 is a graph of viscosity vs. time at 90° C. for the base solution additionally containing 0.1 g and 0.5 g of trimethyl acetylated indulin amine. FIG. 10 shows results at 100° C. for the base solution additionally containing 0.51 grams of trimethyl acetylated induline amine. The results in FIGS. 9 and 10 show that by suitable modification of sulfomethylated indulin amines to render them insoluble at room temperature and hydrolyzable at higher temperatures, a reduction in the viscosity of the solution can be accomplished at elevated temperatures, for example greater than 100° C.

Figure 11:
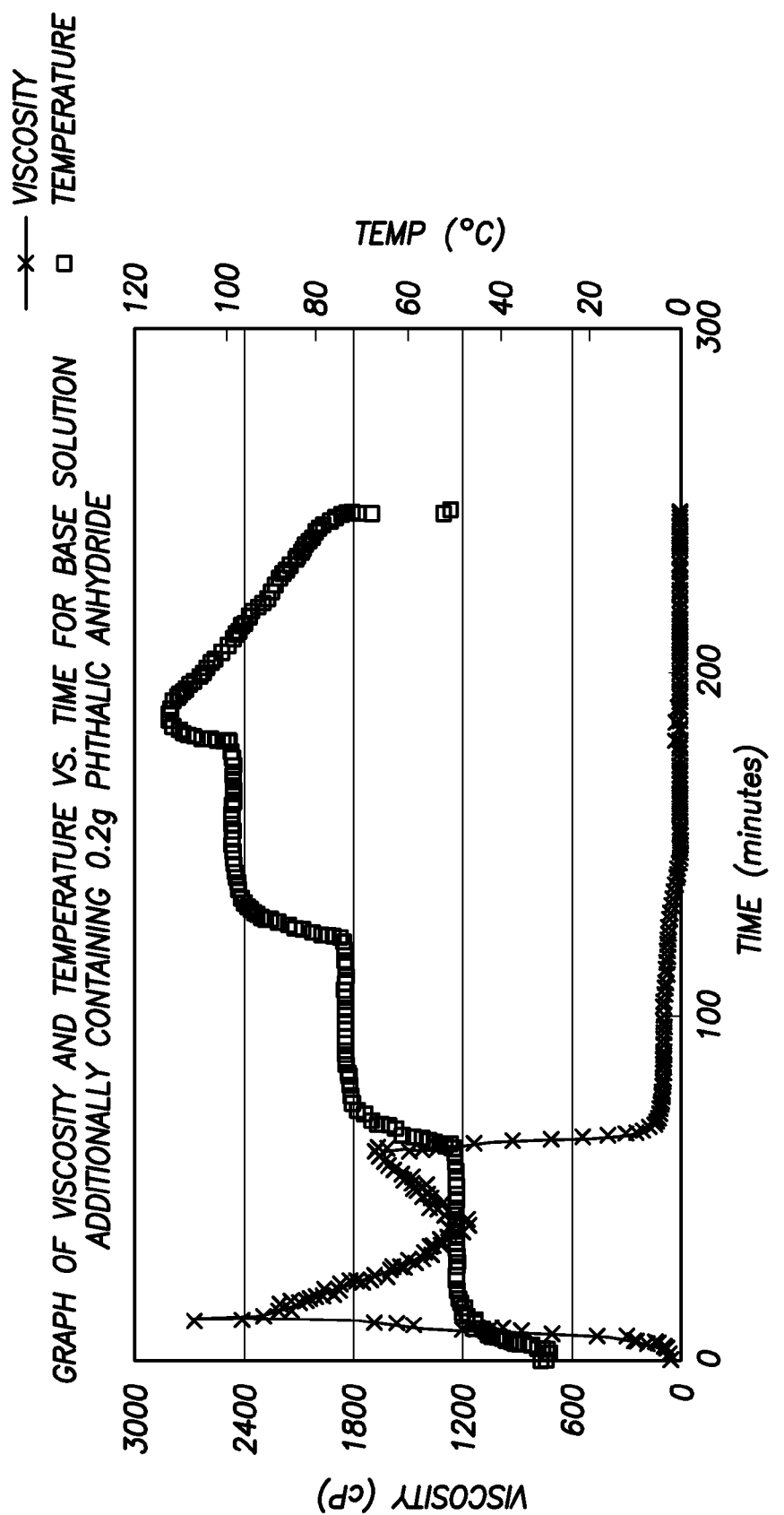
FIG. 11 is a graph of viscosity and temperature vs. time for the base solution additionally containing 0.2 g of phthalic anhydride.
Figure 12:
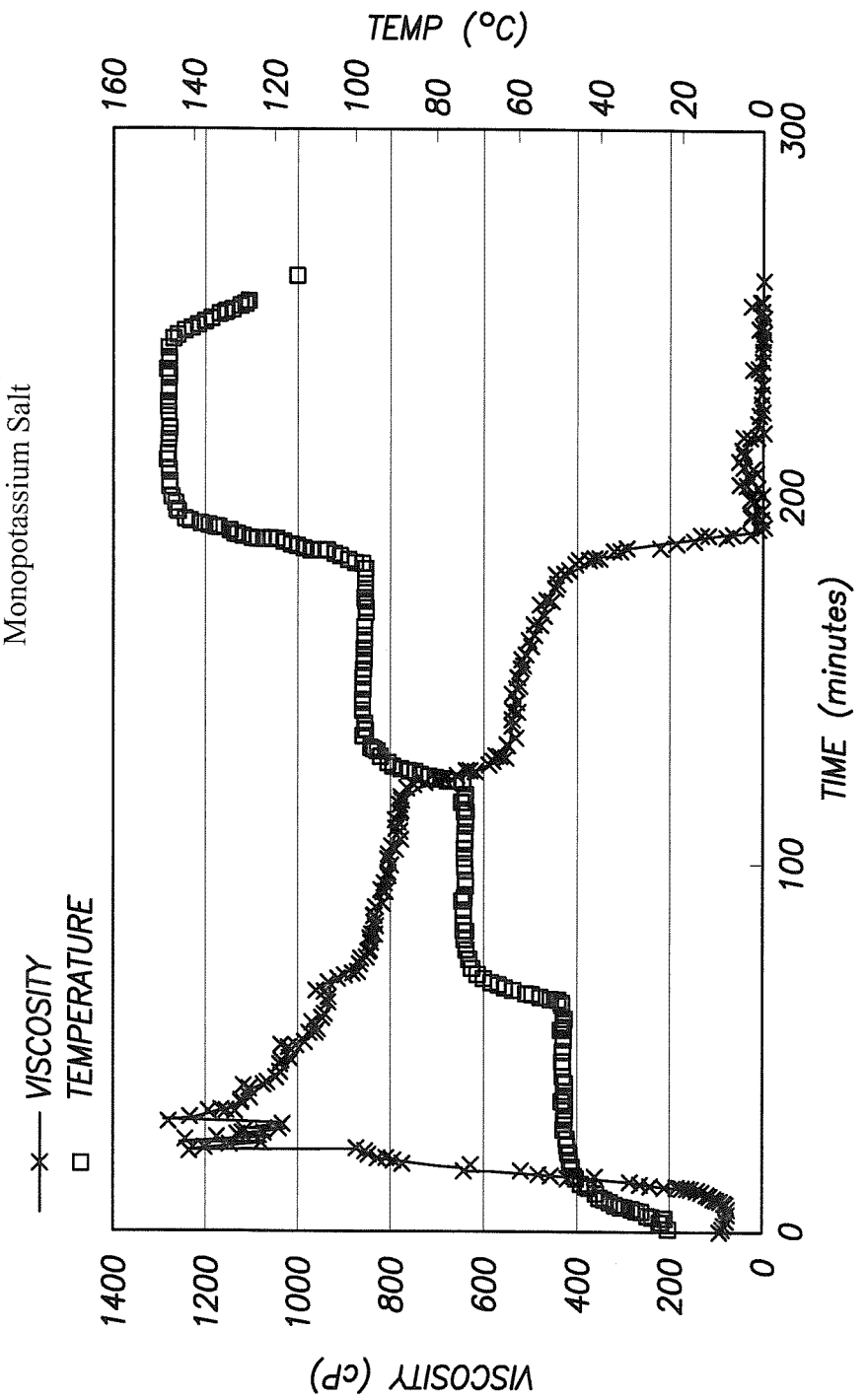
FIG. 12 is a graph of viscosity and temperature vs. time for the base solution additionally containing 0.23 g of phthalic acid monopotassium salt.

FIG. 11 is a graph of viscosity and temperature vs. time for the base solution additionally containing 0.22 g of phthalic anhydride. Phthalic anhydride contains a benzene ring that has two vicinal carboxylic acid groups which have been dehydrated to form the anhydride group. The results show that the material effectively reduces viscosity at or above 80° C. FIG. 12 is a graph of viscosity and temperature vs. time for the base solution additionally containing 0.23 g of phthalic acid monopotassium salt. This molecule contains two carboxylic acids in a vicinal relationship on a benzene ring, whereby one carboxylic acid is neutralized and the other carboxylic acid is in acid form. The results show that the material effectively reduces viscosity at or above 150° C.

Figure 13:
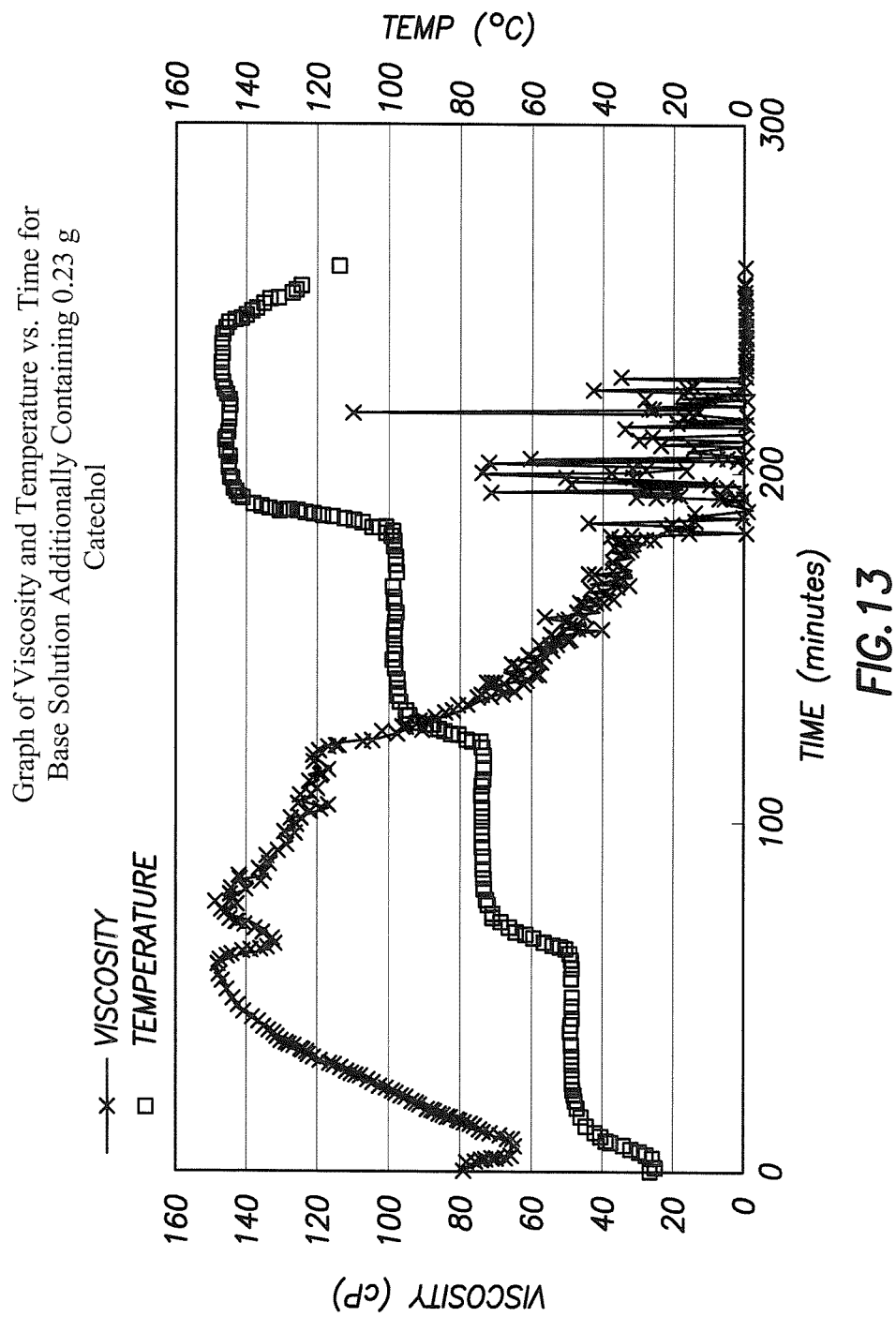
FIG. 13 is a graph of viscosity and temperature vs. time for the base solution additionally containing 0.23 g of catechol.

FIG. 13 is a graph of viscosity and temperature vs. time for the base solution additionally containing 0.23 g of catechol. Catechol is an aromatic compound containing two hydroxyl groups in a vicinal relationship on a benzene ring. The results show that the material effectively reduces viscosity at or above 150° C.

Figure 14:
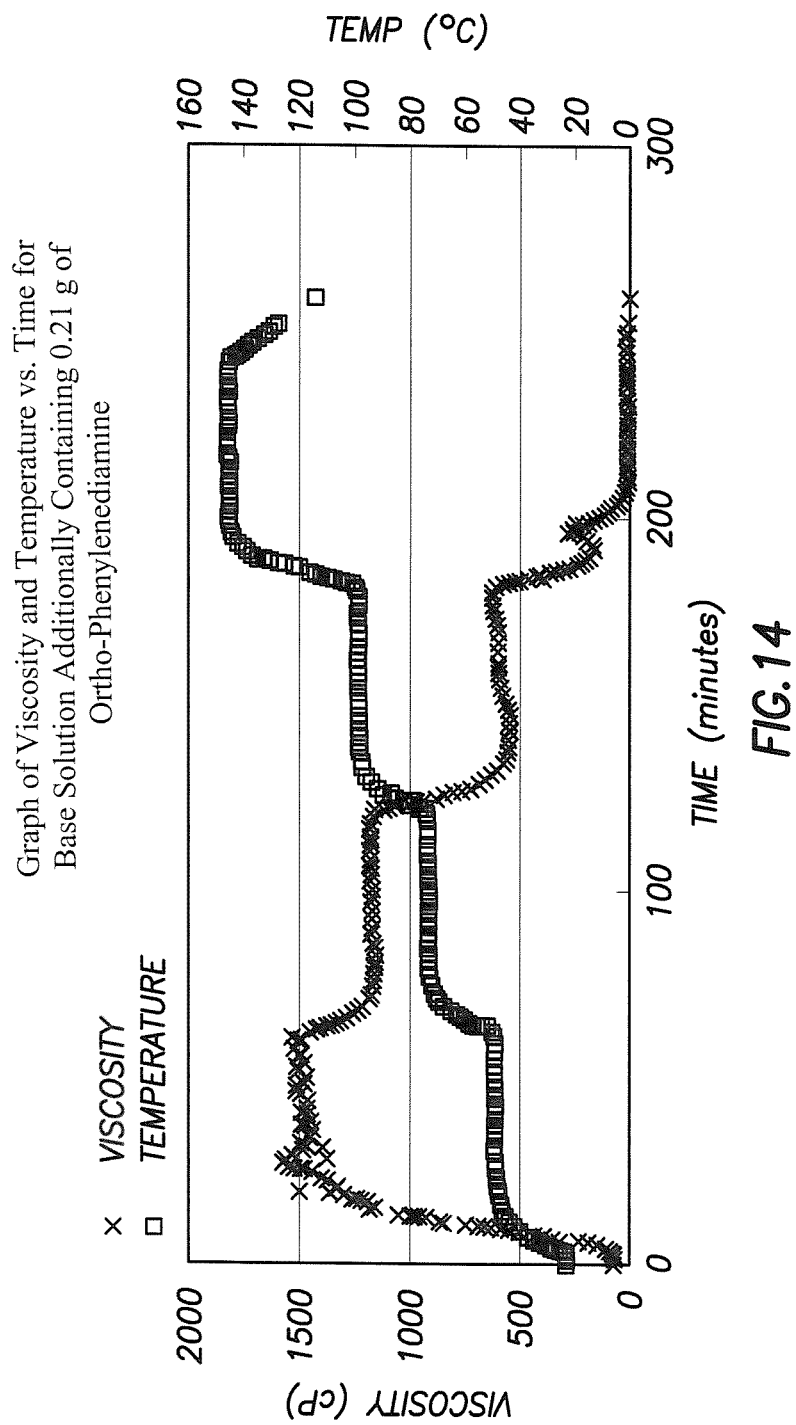
FIG. 14 is a graph of viscosity and temperature vs. time for the base solution additionally containing 0.21 g of ortho-phenylenediamine.

FIG. 14 is a graph of viscosity and temperature vs. time for the base solution additionally containing 0.21 g of ortho-phenylenediamine. Ortho-phenylenediamine is an aromatic compound containing two amine groups in a vicinal relationship on a benzene ring. The results show that the material effectively reduces viscosity at or above 150° C.

It is to be understood that numerous modifications, alterations, subcombinations, and changes can be made in the invention without departing from the spirit and scope of the invention as set forth in the appended claims.

What is claimed is:

1. A method for treating a portion of a well, the method comprising the steps of:
   (A) forming a treatment fluid, the treatment fluid comprising:
      (i) water;
      (ii) a water-soluble polymer;
      (iii) a complexed metal cation that:
         (a) has a valence state of at least three, wherein the metal cation of the complexed metal cation is selected from the group consisting of Fe(3+), Al(3+), Ti(4+), Zr(4+), Hf(4+), and any combination thereof in any proportion; and
         (b) is capable of cross-linking the water-soluble polymer; and
      (iv) an aromatic compound that is capable of dissolving, melting, or chemically decomposing, dissociating, or reacting to form a chelating agent, wherein the chelating agent comprising vicinal substituents containing donor heteroatoms, and wherein the chelating agent is capable of chelating the metal cation;
   wherein a test fluid consisting essentially of, in the same proportions as in the treatment fluid:
      (i) the water;
      (ii) the water-soluble polymer;
      (iii) the complexed metal cation; and
      (iv) the aromatic compound, wherein the aromatic compound is non-encapsulated in the test fluid,
   is capable of:
      (i) increasing from an initial viscosity to a maximum viscosity that is greater than the initial viscosity; and then
      (ii) decreasing to a decreased viscosity that is less than the maximum viscosity,
   when tested by heating the test fluid at a constant rate from an initial temperature of 25° C. to at least one elevated temperature in the range of 50° C.-100° C. over the course of 10 minutes and then maintained at that elevated temperature; and
   (B) introducing the treatment fluid into the well;
wherein the chelating agent comprises at least one of the following chemical structures having an aromatic ring and wherein X and Y are vicinal:

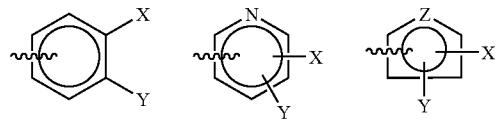

wherein X and Y each independently is selected from the group consisting of —O—, —COR, —O⁻A⁺, —NR₁R₂, —OR, —COOH, —COO⁻A⁺, —C(R)O, —CONR₁R₂, —CR₁R₂OH, —CR₁R₂NH2, —CR₁R₂—COOH, —CR₁R₂COOR, —CR₁R₂COO⁻A⁺, —C(R)=NR, —SR, and —S⁻A⁺;
wherein R, R1, and R2 are independently H, or alkyl groups containing 1-4 carbons;
wherein A⁺ is an alkali metal ion or an ammonium ion;
wherein Z can be S, O, or NH; and
wherein the aromatic ring is selected from the group consisting of a benzene ring, a pyridine ring, a thiophene ring, a pyrrole ring, a naphthalene ring, an anthracene ring, and a phenanthrene ring.

2. The method according to claim 1, wherein the polymer is selected from the group consisting of guar, xanthan, diutan, hydroxyethyl guar, hydroxypropyl guar, carboxymethylhydroxyethyl guar, carboxymethyl hydroxypropyl guar, hydroxyethylcellulose, carboxymethylhydroxyethyl cellulose, carboxymethyl starch, a copolymer of 2-acrylamido-2-methyl-propane sulfonic acid and acrylamide, a terpolymer of 2-acrylamido-2-methyl-propane sulfonic acid, acrylic acid, and acrylamide, and any combination thereof in any proportion.

3. The method according to claim 1, wherein the polymer is at a concentration of at least 0.1% by weight of the water in the treatment fluid.

4. The method according to claim 1, wherein the polymer and complexed metal cation cross-link to form a metal cation-polymer network prior to the step of introducing.

5. The method according to claim 1, wherein the treatment fluid comprises proppant.

6. The method according to claim 1, wherein the chelating agent chelates the metal cation to form a metal-chelate complex with at least five atoms.

7. The method according to claim 1, wherein at least some of the aromatic compound in the treatment fluid is encapsulated.

8. The method according to claim 1, wherein the aromatic compound in the treatment fluid is non-encapsulated.

9. A method for treating a portion of a well, the method comprising the steps of:

(A) forming a treatment fluid, the treatment fluid comprising:
  (i) water;
  (ii) a water-soluble polymer;
  (iii) a complexed metal cation that:
    (a) has a valence state of at least three; and
    (b) is capable of cross-linking the water-soluble polymer; and
  (iv) an aromatic compound that is capable of dissolving, melting, or chemically decomposing, dissociating, or reacting to form a chelating agent, wherein the chelating agent comprising vicinal substituents containing donor heteroatoms, and wherein the chelating agent is capable of chelating the metal cation;
wherein a test fluid consisting essentially of, in the same proportions as in the treatment fluid:
  (i) the water;
  (ii) the water-soluble polymer;
  (iii) the complexed metal cation; and
  (iv) the aromatic compound, wherein the aromatic compound is non-encapsulated in the test fluid,
is capable of:
  (i) increasing from an initial viscosity to a maximum viscosity that is greater than the initial viscosity; and then
  (ii) decreasing to a decreased viscosity that is less than the maximum viscosity,
when tested by heating the test fluid at a constant rate from an initial temperature of 25° C. to at least one elevated temperature in the range of 50° C.-100° C. over the course of 10 minutes and then maintained at that elevated temperature; and
(B) introducing the treatment fluid into the well;
wherein the chelating agent comprises at least one of the following chemical structures having an aromatic ring and wherein X and Y are vicinal:

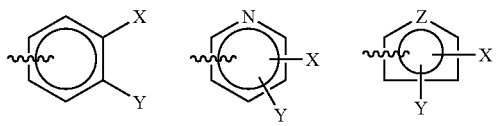

wherein X and Y each independently is selected from the group consisting of —OH, —O—, —COR, —O⁻A⁺, —NR₁R₂, —OR, —COOH, —COO⁻A⁺, —C(R)O, —CONR₁R₂, —CR₁R₂OH, —CR₁R₂NH2, —CR₁R₂—COOH, —CR₁R₂COOR, —CR₁R₂COO⁻A⁺, —C(R)=NR, —SR, and —S⁻A⁺;
wherein R, R1, and R2 are independently H, or alkyl groups containing 1-4 carbons;
wherein A⁺ is an alkali metal ion or an ammonium ion;
wherein Z can be S, O, or NH; and
wherein the aromatic ring is selected from the group consisting of a pyridine ring, a thiophene ring, a pyrrole ring, a naphthalene ring, an anthracene ring, and a phenanthrene ring.

10. A method for treating a portion of a well, the method comprising the steps of:
(A) forming a treatment fluid, the treatment fluid comprising:
  (i) water;
  (ii) a water-soluble polymer;
  (iii) a complexed metal cation that:
    (a) has a valence state of at least three; and
    (b) is capable of cross-linking the water-soluble polymer; and
  (iv) an aromatic compound that is capable of dissolving, melting, or chemically decomposing, dissociating, or reacting to form a chelating agent, wherein the chelating agent comprising vicinal substituents containing donor heteroatoms, and wherein the chelating agent is capable of chelating the metal cation;
wherein a test fluid consisting essentially of, in the same proportions as in the treatment fluid:
  (i) the water;
  (ii) the water-soluble polymer;
  (iii) the complexed metal cation; and
  (iv) the aromatic compound, wherein the aromatic compound is non-encapsulated in the test fluid, is capable of:
  (i) increasing from an initial viscosity to a maximum viscosity that is greater than the initial viscosity; and then
  (ii) decreasing to a decreased viscosity that is less than the maximum viscosity,
when tested by heating the test fluid at a constant rate from an initial temperature of 25° C. to at least one elevated temperature in the range of 50° C.-100° C. over the course of 10 minutes and then maintained at that elevated temperature; and
(B) introducing the treatment fluid into the well;
wherein the aromatic compound is selected from the group consisting of, anthranilic acid, acetyl anthranilic acid, eugenol, vanillin, 1,2-dihydroxybenzene, unsubstituted phthalic acid, ortho-phenylenediamine, ortho-aminophenol, and ortho-hydroxyphenylacetic acid.

11. A method for treating a portion of a well, the method comprising the steps of:
(A) forming a treatment fluid, the treatment fluid comprising:
  (i) water;
  (ii) a water-soluble polymer;
  (iii) a complexed metal cation that:
    (a) has a valence state of at least three; and
    (b) is capable of cross-linking the water-soluble polymer; and
  (iv) an aromatic compound that is capable of dissolving, melting, or chemically decomposing, dissociating, or reacting to form a chelating agent, wherein the chelating agent comprising vicinal substituents containing donor heteroatoms, and wherein the chelating agent is capable of chelating the metal cation;
wherein a test fluid consisting essentially of, in the same proportions as in the treatment fluid:
  (i) the water;
  (ii) the water-soluble polymer;
  (iii) the complexed metal cation; and
  (iv) the aromatic compound, wherein the aromatic compound is non-encapsulated in the test fluid,
is capable of:
  (i) increasing from an initial viscosity to a maximum viscosity that is greater than the initial viscosity; and then
  (ii) decreasing to a decreased viscosity that is less than the maximum viscosity,
when tested by heating the test fluid at a constant rate from an initial temperature of 25° C. to at least one elevated temperature in the range of 50° C.-100° C. over the course of 10 minutes and then maintained at that elevated temperature; and (B) introducing the treatment fluid into the well;
wherein the aromatic compound is selected from the group consisting of sulfonated amino lignins and acetylated sulfomethylated ligninamine.

12. The method according to claim 1, wherein the aromatic compound is at a concentration in the treatment fluid such that the aromatic compound is capable of forming a chelating agent in the water in a concentration sufficient to chelate at least 25% of the mole concentration of the metal cation.

13. The method according to claim 1, wherein the maximum viscosity of the test fluid is at least 200 cP.

14. The method according to claim 1, wherein the maximum viscosity of the test fluid is at least four times the initial viscosity and the decreased viscosity is less than 50% of the maximum viscosity.

15. The method according to claim 1, wherein the decreased viscosity of the test fluid is less than 10% of the maximum viscosity.

16. The method according to claim 1, wherein the test fluid is maintained at the maximum viscosity for at least 30 minutes before the viscosity decreases.

* * * * *